(No Model.)
W. R. HOWE.
ELASTIC TREAD HORSESHOE.
No. 585,208. Patented June 29, 1897.
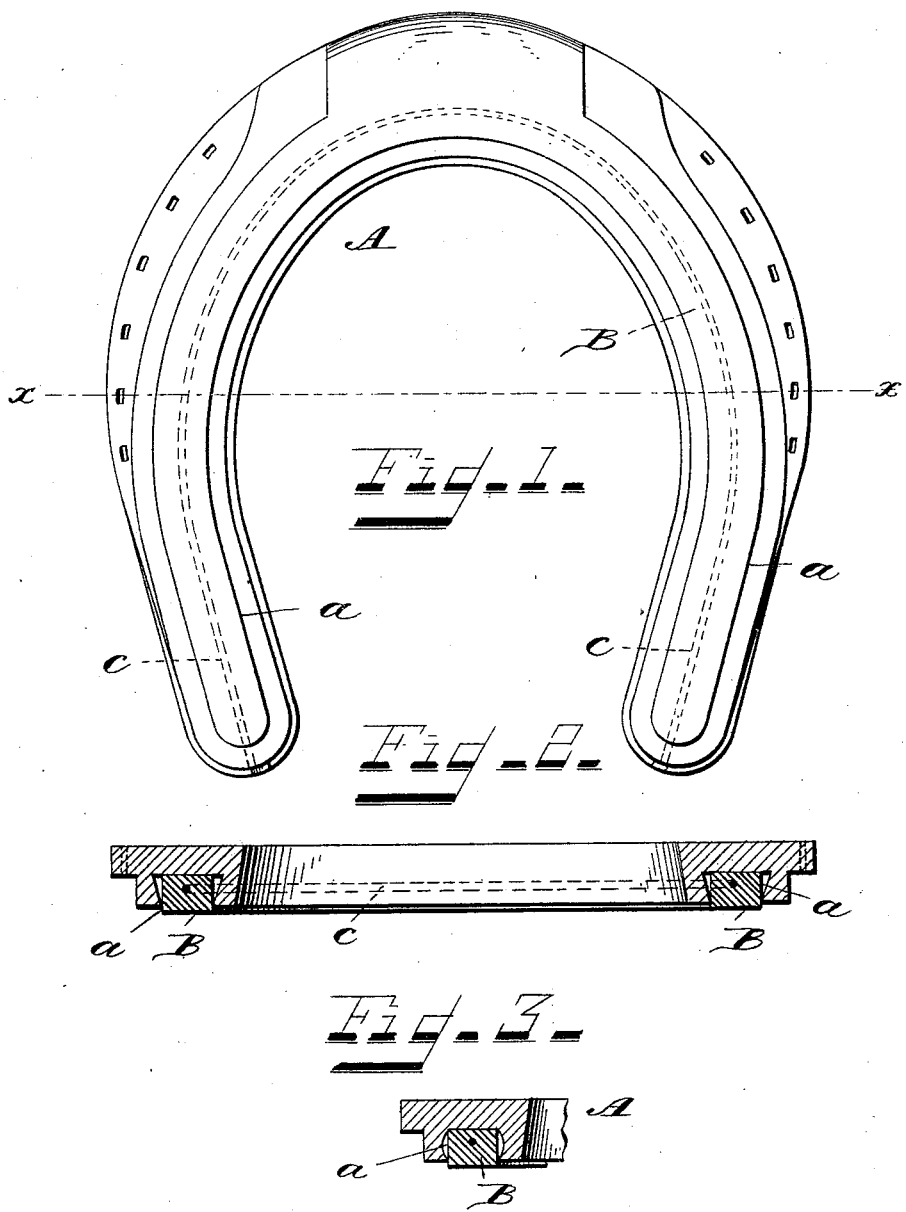
Witnesses:
Bernard J. Hausfeld.
J. Thomson Crose
Inventor.
William R. Howe
by Chas. M. Beck
his Attorney.

UNITED STATES PATENT OFFICE.

WILLIAM R. HOWE, OF DAYTON, OHIO.

ELASTIC-TREAD HORSESHOE.

SPECIFICATION forming part of Letters Patent No. 585,208, dated June 29, 1897.

Application filed September 11, 1895. Serial No. 562,141. (No model.)

*To all whom it may concern:*

Be it known that I, WILLIAM R. HOWE, a citizen of the United States, residing at Dayton, in the county of Montgomery and State of Ohio, have invented certain new and useful Improvements in Elastic-Tread Horseshoes, of which the following is a full, clear, and exact description, reference being had to the accompanying drawings, forming part of this specification.

My invention relates to that class of horseshoes containing on their under side a groove for the reception of an elastic packing to prevent shocks and jars and to keep the horse from slipping; and it has for its object the improved construction of such shoes whereby their durability and efficiency are increased.

The novelty of my invention will be hereinafter described, and specifically set forth in the claim.

In the accompanying drawings, Figure 1 is a bottom plan view of a horseshoe embodying my invention. Fig. 2 is a transverse section of the same on the dotted line $x$ $x$ of Fig. 1. Fig. 3 is a transverse section of a shoe, showing a modification in the form of the groove.

The same letters of reference are used to indicate identical parts in all of the figures.

A is the body of the shoe, of the usual or any suitable construction, preferably that of my prior patent, No. 530,528, of December 11, 1894, made of iron or any other metal, with a groove $a$ on its under side extending entirely around it. This groove, however, is unlike that of my prior patent above referred to in that it is enlarged or made dovetailed from its opening side inward, as seen in Figs. 2 and 3. At the toe the front wall of the groove may, if desired, be cut away or dispensed with, as in my prior patent aforesaid, or the groove may continue without this toe-opening.

Fitted within the groove and extending slightly beyond the metal of the bottom of the shoe is an elastic packing B, which is of soft vulcanized rubber or any other suitable material possessing its characteristics of elasticity and adhesion on wet or slippery surfaces. While this packing at the point where it projects from the metal of the shoe entirely fills the width of the groove, yet it will be seen that a space is left on each side of the packing within the groove, as shown in Figs. 2 and 3, so that the packing when receiving the weight of the horse may readily enter the groove and spread without injury to the packing, and will when the weight is removed at once spring out again and project from the metal of the shoe. This provision of a space for the packing to spread within the groove when compressed and means for securing the packing in place constitutes the essence of my invention and is a most valuable feature, for without it the packing would be crowded out over the edges of the groove on the bottom of the shoe and would soon be cut or worn off. By providing, however, for its ready entrance and spreading within the groove the life of the packing is prolonged, and one packing will last as long as the metal of the shoe and will not require replacing. The shape of the interior of the groove is immaterial, so long as a space is left to permit the packing to spread and be contained entirely within the groove when pressure is applied to it by the action of the horse in walking or running.

I prefer to make the packing rectangular in cross-section, as shown, though other forms may be employed; and to hold it in place I provide a wire $c$, which is strung through a perforation through the packing and passes out through perforations in the heel of the shoe and is clenched thereon, as in my prior patent aforesaid.

It will thus be seen that the retaining-wire enables the packing to be made of such proportions as to permit it to be readily expanded within the groove and at the same time have it securely held in place.

Having thus fully described my invention, what I claim, and desire to secure by Letters Patent, is—

In a horseshoe, the combination with a metal body provided with a groove, on its under side, whose walls converge toward the outer edge of the groove, an elastic packing in the groove projecting slightly therefrom, the inclosed part of the packing being of such dimension as to be readily expansible within the groove, and a wire passing longitudinally through the packing and secured to the shoe, substantially as shown and described.

In witness whereof I have hereunto set my hand this 3d day of September, A. D. 1895.

WILLIAM R. HOWE.

Witnesses:
E. E. SCHAUTZ,
WILLIAM B. SULLIVAN.